United States Patent [19]

Lagarelli

[11] 4,445,529

[45] May 1, 1984

[54] ADJUSTABLE VALVE HANDLE

[75] Inventor: Carmen J. Lagarelli, Clayton, Del.

[73] Assignee: Speakman Company, Wilmington, Del.

[21] Appl. No.: 297,735

[22] Filed: Aug. 31, 1981

[51] Int. Cl.³ .............................................. F16L 5/02
[52] U.S. Cl. .................................. 137/360; 251/292; 403/359; 403/362
[58] Field of Search ............... 137/360; 251/291, 292; 403/359, 362

[56] References Cited

U.S. PATENT DOCUMENTS

| 995,027 | 6/1911 | Mueller | 251/292 |
| 3,574,366 | 4/1971 | Thostenson | 403/359 |
| 3,582,116 | 6/1971 | Young | 403/359 |
| 4,240,462 | 12/1980 | Bankstahl | 137/377 |
| 4,343,564 | 8/1982 | Francis | 137/362 |

Primary Examiner—Martin P. Schwadron
Assistant Examiner—Sheri Novack
Attorney, Agent, or Firm—Connolly and Hutz

[57] ABSTRACT

An adjustable valve handle is disclosed which permits wide variation in location of a recessed plumbing fixture relative to the wall behind which it is placed. This wide range of adjustment is accomplished utilizing a stem over which a handle with an elongated bore is placed. Securing means in the handle permits placement of the handle at numerous locations along the stem without the necessity of cutting, breaking off or otherwise altering the stem.

3 Claims, 2 Drawing Figures

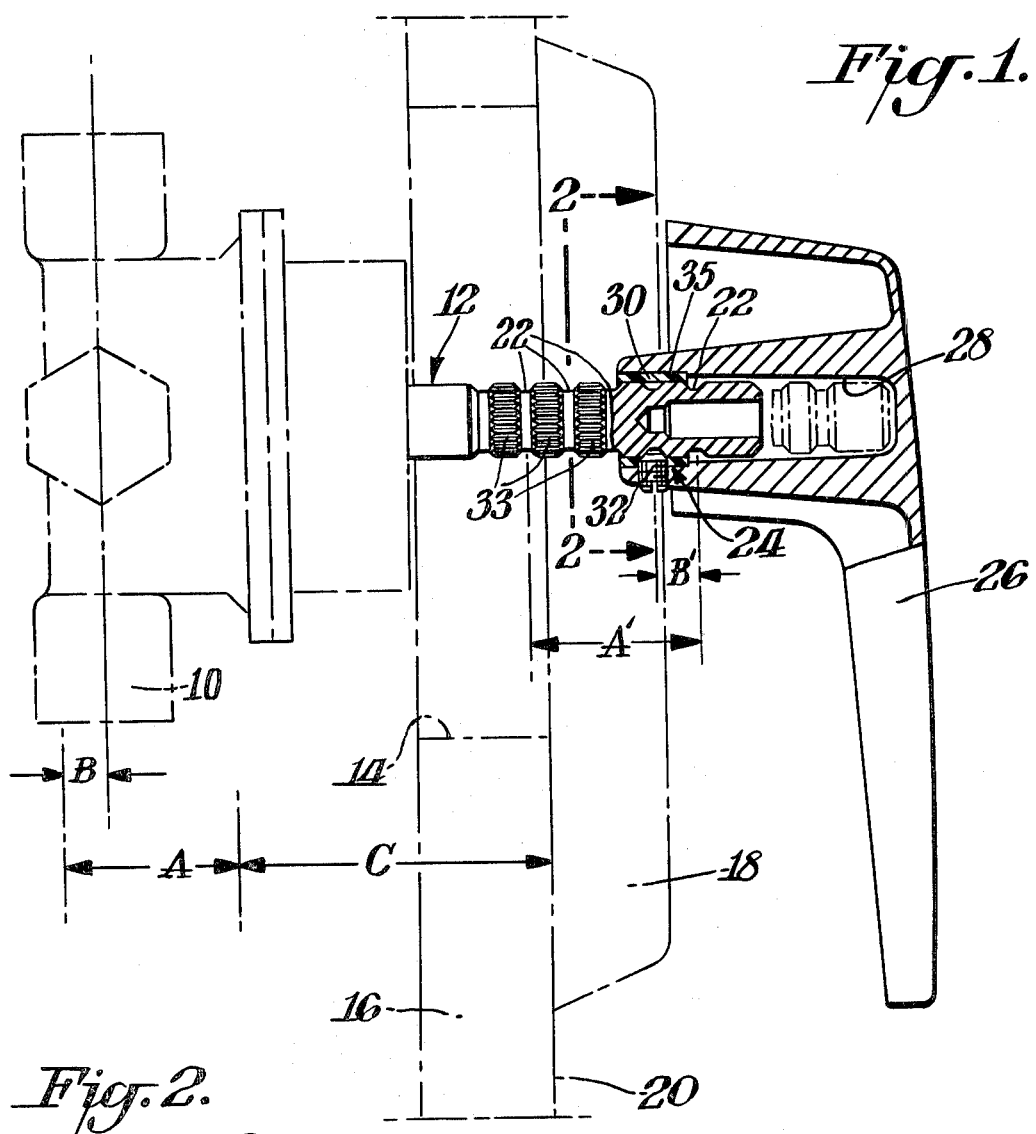
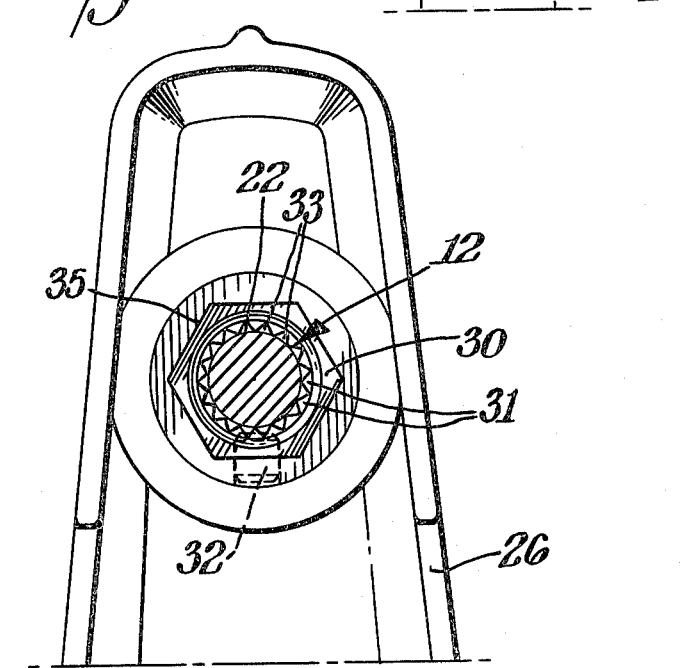

ADJUSTABLE VALVE HANDLE

BACKGROUND OF THE INVENTION

Most plumbing valves (fixtures) used in baths and showers are recessed behind a wall (usually tile) with only the operating stem of the fixture extending through the wall. Notwithstanding instructions as to proper location of such fixtures relative to the outer surface (facing a bather) of the wall, considerable dimensional variance exists in placement of such fixtures.

One approach to accommodating this variation is shown in U.S. Pat. No. 4,240,462 wherein the valve operating stem contains circumferential notches along its length which allow the stem to be broken or sawed off at whatever length is needed to assure proper placement of the handle on the stem to bring it in close proximity to the wall.

BRIEF SUMMARY OF THE INVENTION

In contrast to the approach disclosed in U.S. Pat. No. 4,240,462 the valve of this invention comprises a splined stem with circumferential grooves thereon over which is placed a handle with an elongated bore therein. The handle can thus be moved up and down the stem until it is in proper position relative to the wall. Securing means in the handle then permits the handle to be fixed in position on the stem without cutting or breaking off any of the stem.

DESCRIPTION OF THE DRAWINGS

The invention may be better understood from a reading of the following detailed description in conjunction with the drawings in which FIG. 1 illustrates in side elevation a recessed valve positioned relative to a wall and the adjustable arrangement of the handle on the valve stem shown in partial longitudinal section; and FIG. 2 is a partial end elevational view along lines 2—2 of FIG. 1 of the handle with detail of the securing means illustrated.

DETAILED DESCRIPTION

In FIGS. 1 and 2 a recessed valve 10 is shown with valve stem 12 extending therefrom through a suitable sized opening 14 in wall 16. A decorative escutcheon 18 covers the opening 14 in the wall and seals out water which might otherwise leak through the opening.

Placement of the valve 10 relative to the outer surface 20 of wall 16 (sometimes referred to as the "roughing-in" dimension) is illustrated in FIG. 1. The minimum dimension between the centerline of valve 10 and wall surface 20 is illustrated in "C" and the maximum as "A" plus "C".

In the situation where this roughing-in dimension is at its maximum, i.e., distance "A" plus "C", the stem 12 extends beyond wall surface 20 and escutcheon 18 just enough for the last groove 22 of the stem 12 to be engaged by securing means 24 of the handle 26. At the opposite extreme when the roughing-in dimension is at its minimum, i.e., distance "C" the stem extends well beyond the wall 20 and escutcheon 18. In prior art devices this extra length of stem would result in the handle protruding into the bathing area in a very unaesthetic relationship to the escutcheon 18. As shown in U.S. Pat. No. 4,240,462 the stem 12 would have to be cut off to get the handle in proper proximity to the wall 20. In this invention, however, an elongated bore 28 in the handle accommodates the extra length of stem 12 (shown in phantom in FIG. 1).

The preferred form of means used to secure handle 26 to stem 12 is illustrated in the drawings. The securing means preferable comprises a hard plastic or nylon insert 30 received in the end of the handle 20. This insert 30 has an outer hexagonal cross-section that is received by a hexagonal socket 35 in the handle, thereby ensuring that both the socket and the handle are one cooperative unit during rotation of the handle. This insert 30 has internal splines 31 corresponding to those splines 33 on stem 12. Extending through the wall of handle 26 and insert 30 is a setscrew 32 which has a tapered end specifically designed to fit within grooves 22 on valve stem 12. If, necessary, however, the setscrew 32 may also be tightened against the splines 33 on stem 12 to hold the handle 26 in position. The splined stem 12 is interrupted by a series of grooves 22 that are spaced a distance "B" apart, preferable about ¼ of an inch. Thus, in the embodiment illustrated, the distance "A" is about 1 inch. Accordingly this leeway in placement of valve 10 relative to wall 20 considerably simplifies installation.

I claim:

1. An adjustable valve operator for use with a valve recessed in a wall, comprising a valve body capable of being located inside the wall at varying distances from the outer surface of the wall, a valve stem extending from the valve body at varying distances beyond the outer surface of the wall depending upon the location of the valve body, the valve stem having splines along its length and non-frangible, spaced circumferential grooves thereon which interrupt the splines at regular spaced intervals on the stem, a handle slidable onto said stem having an elongated bore therein to facilitate substantial movement of the handle relative to the stem and placement of the handle close to the outer surface of the wall and threaded securing means located in a threaded bore in the handle aligned transverse of the stem, the securing means having an inner tapered surface arranged for mating engagement with the outer surface of one of the circumferential grooves on the stem whereby the handle can be affixed to the stem in close proximity to the outer wall.

2. The adjustable valve operator of claim 1, wherein a portion of the bore in the handle is splined.

3. The adjustable valve operator of claim 1 including an annular insert within the handle, and splines on the inside surface of the insert constructed and arranged for mating engagement with the splines on the valve stem.

* * * * *